United States Patent [19]

Tunekawa et al.

[11] 4,037,234
[45] July 19, 1977

[54] EXPOSURE CONTROL SYSTEM STABILIZED AGAINST TEMPERATURE VARIATION

[75] Inventors: Tokuichi Tunekawa, Yokohama; Soichi Nakamoto, Machida; Tetsuya Taguchi, Kawasaki, all of Japan

[73] Assignee: Canon Kabushiki Kaisha, Tokyo, Japan

[21] Appl. No.: 645,356

[22] Filed: Dec. 30, 1975

Related U.S. Application Data

[63] Continuation of Ser. No. 463,721, April 24, 1974, abandoned.

[30] Foreign Application Priority Data

Apr. 28, 1973 Japan ............................ 48-48673
June 28, 1973 Japan ............................ 48-73200

[51] Int. Cl.$^2$ ............................................. G03B 7/08
[52] U.S. Cl. ............................ 354/24; 354/50; 354/60 R; 354/60 E
[58] Field of Search ............... 354/23 R, 40, 43, 50, 354/51, 60 R, 60 E; 356/218, 223

[56] References Cited

U.S. PATENT DOCUMENTS

| | | | |
|---|---|---|---|
| 3,426,357 | 2/1969 | Paulus | 354/24 |
| 3,587,421 | 6/1971 | Ono | 354/24 |
| 3,712,190 | 1/1973 | Nobusawa | 354/24 |
| 3,731,603 | 5/1973 | Ono et al. | 354/24 |
| 3,736,851 | 6/1973 | Ono et al. | 354/24 |
| 3,820,126 | 6/1974 | Haratake | 354/24 |
| 3,883,882 | 5/1975 | Mori | 354/24 |
| 3,936,842 | 2/1976 | Nanba et al. | 354/60 E |

OTHER PUBLICATIONS

"All–Silicon Timing Circuit for Automatic Cameras" *Microelectronics & Reliability,* 1970, vol. 9, No. 4, pp. 335–340.

*Primary Examiner*—Russell E. Adams
*Attorney, Agent, or Firm*—Toren, McGeady and Stanger

[57] ABSTRACT

An exposure control system for a camera capable of deriving more reliable and accurate exposure values over an extended range of scene luminance despite variation of the ambient temperature of the system than was previously possible. The exposure control system is characterized by the use of a photovoltaic cell and a logarithmic converter connected thereto in combination with a voltage stabilizer for providing output current signals of which the values are independent of temperature to the automatic camera diaphragm aperture regulating mechanism. The logarithmic converter consists of an operational amplifier with a feedback diode connected between the input and the output of the operational amplifier. The voltage stabilizer connected to the operational amplifier comprises a plurality of transistors selected to have such characteristics that the temperature dependance components of the luminance versus output signal response characteristic of the photovoltaic cell and the logarithmic conversion of the converter are cancelled by the temperature dependence component of the voltage supplied from the voltage stabilizer.

6 Claims, 8 Drawing Figures

EXPOSURE CONTROL SYSTEM STABILIZED AGAINST TEMPERATURE VARIATION

This is a continuation of application Ser. No. 463,721 which was filed Apr. 24, 1974, now abandoned.

BACKGROUND OF THE INVENTION

1. Field of the Invention:

This invention relates to exposure control systems form cameras, and more particularly to an improvement in stabilization of the exposure control system against variation of the ambient temperature for deriving reliable and accurate exposure values as needed for low scene luminance range.

2. Description of the Prior Art:

Conventional exposure control apparatus utilize a photoconductive cell as a light-receiving element. The photoconductive cell is characterized as having a limited linear range of its luminance versus output current signal response characteristic, and the response in a low current range is substantially in error. Accordingly, this type of exposure control apparatus cannot be used directly on very small current signals as might be obtained when photographing subjects having very low luminances. It has been suggested that by using a photovoltaic cell such as a blue cell and photodiode as a sensor, the linear response range can be extended toward the lower limit. In this case, however, photovoltaic cells, which generally provide gentle slopes of ramp of the output voltages with respect to the scene luminance, require operational amplifiers for association therewith to produce sufficient high levels of the signal voltages. The use of operational amplifiers in an exposure control system creates an alternative difficulty of stabilizing the system against variation of the ambient temperature due to the temperature dependences of amplification of the operational amplifiers. To ignore instabilities of the operational amplifiers is to limit the accuracy of exposure control by which correct exposure would be otherwise made.

SUMMARY OF THE INVENTION

In accordance with the present invention, a photovoltaic cell is used as a sensor in association with a logarithmic converter consisting of an operational amplifier having a pair of input terminals and having an output terminal with a feedback diode connected between one of the input terminals and the output terminal of the operational amplifier. In a preferred embodiment, the output terminal of the operational amplifier is connected to a current meter means by means of which a camera diaphragm aperture regulating mechanism is preset to a value in conformance with a preselected shutter speed. In order to eliminate the temperature dependence components of the luminance versus output voltage signal response of the photovoltaic cell as well as of the logarithmic conversion of the logarithmic converter, there is provided a voltage stabilizer connected to the other input terminal of the operational amplifier and constructed as comprising a plurality of transistors selected to have such characteristics that the aforesaid temperature components can be balanced out with the temperature dependence components of the voltage supplied from the resulting voltage stabilizer.

An object of the present invention is to provide an exposure control system for determining more reliable and accurate exposure values over an extended lower limit range of scene luminance despite variation of the ambient temperature of the system than was previously possible.

Other objects and advantages will in part be obvious and will in part become apparent from the description to follow hereinafter.

BRIEF DESCRIPTION OF THE DRAWINGS

The invention accordingly comprises the system, apparatus and method possessing the features, and the combination of elements and arrangement of parts which are exemplified in the following detailed disclosure of a preferred embodiment and modifications in part thereof taken in connection with the accompanying drawings, wherein.

DESCRIPTION OF THE PREFERRED EMBODIMENT

Figure 1:
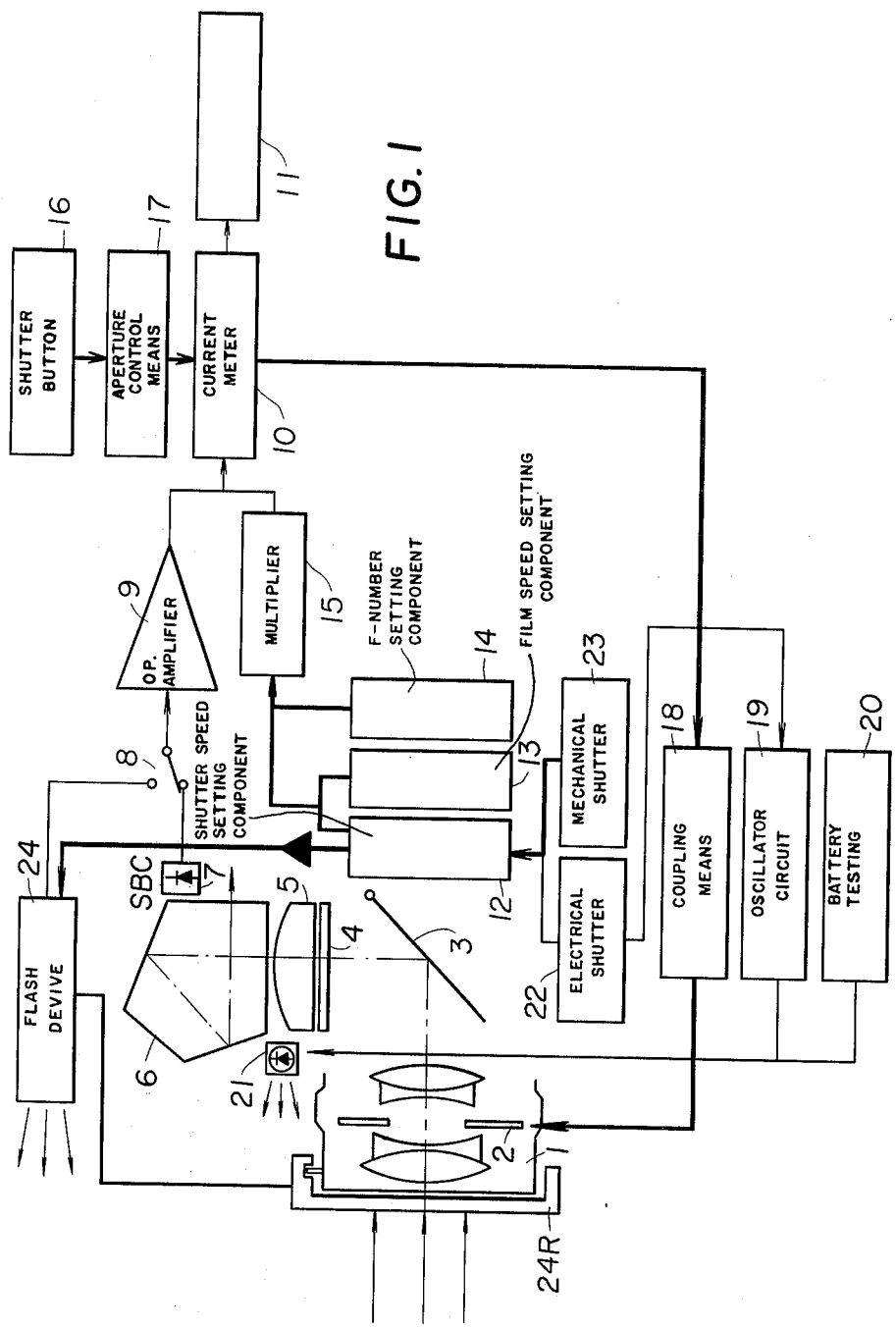
FIG. 1 is a schematic representation of one embodiment of an exposure control system adapted for use with a single lens reflex camera according to the invention.

Referring to FIG. 1, a preferred embodiment of the exposure control system is illustrated which is arranged in a single lens reflex camera including an objective lens system 1. An adjustable diaphragm device 2 mounted in a space within the lens system 1, a tiltable mirror 3 located between the lens 1 and a focal plane shutter not shown, and a view finder system including a focussing screen 4, a condenser lens 5 and a roof pentaprism 6. Positioned behind the exit face of the pentaprism 5 and above an eye-piece not shown is a light value sensing means comprising a photovoltaic cell 7, of which one terminal is connected to a fixed contact of a double throw switch 8. The movable contact of the switch 31 is connected to the input of an operational amplifier 9. The output terminal of the operational amplifier 9 is connected to one terminal of a current meter 10 of which the needle can be viewed by the photographer through the eye piece of the viewfinder system. The current meter 10 is arranged in a camera diaphragm aperture regulating mechanism comprising aperture control means 17 and coupling means 18 coupling the means 17 with the diaphragm device 2 upon the setting of a shutter speed setting component 12, a film speed setting component 13 and an f-number setting component 14 to preset the mechanism to a value in conformance with the selected exposure interval and the sensitivity of a film, which is being used, or which is about to be used, through the intermediary of a multiplier 15 in which informations from the setting components 12, 13 and 14 are electrically combined with one another. In this manner, the needle of the current meter 10 is deflected to a position determined in conformance with the derived exposure value. The shutter speed setting component 12 in associated both with an electrically timed shutter 22 and with a mechanically timed shutter 23, these shutters 22 and 23 being arranged to be actuatable independently of each other. The exposure control system further includes an oscillator circuit 19 connected to light-emitting diode 21 for energizing it during the time interval when the photographic film is being exposed, a battery testing circuit 20 connected to the diode 21 and a flash device 24 for automatic flash photography having a variable resistor 24R mounted in the distance adjusting ring of the lens barrel to adjust the flash energy in accordance with the camera-to-object distance.

In operation with a single lens reflex camera, an interchangeable objective lens 1 is selected for attachment to the camera body. The setting components 13 and 14 are set, respectively, to the associated film speed rating and to the maximum relative aperture available in the objective lens 1, thereby the position of the deflected needle of the current meter 10 indicates a diaphragm value to which the diaphragm aperture regulating mechanism is preset, and which can be read by the camera operator looking through the viewfinder. When the intended shutter speed is slow, the electrically timed shutter 22 is selected for connection to the exposure control system while when the intended shutter speed is fast, the mechanically timed shutter is selected for connection thereto, the selection of the shutters 22 and 23 is effected by means of a selector means not shown. With the exposure control system associated with the electrically timed shutter, upon depression of the shutter button 16, the area of the diaphragm aperture of the interchangeable objective 1 is adjusted in automatic response to the angular position of the deflected needle of the current meter 10. Next, the mirror 3 is moved to the blocking position in response to an actuation of the shutter release mechanism not shown and the shutter not shown is opened to expose the film. So long as the shutter is opened, the light-emitting diode 21 is energized by the oscillator circuit, flickering so that the camera operator can see from the outside that the shutter is in operation. When the battery testing circuit is selected for operation with the diode 21, the oscillator circuit is made operative to energize the diode 21, provided that the battery voltage is more than the predetermined level.

Figure 2:
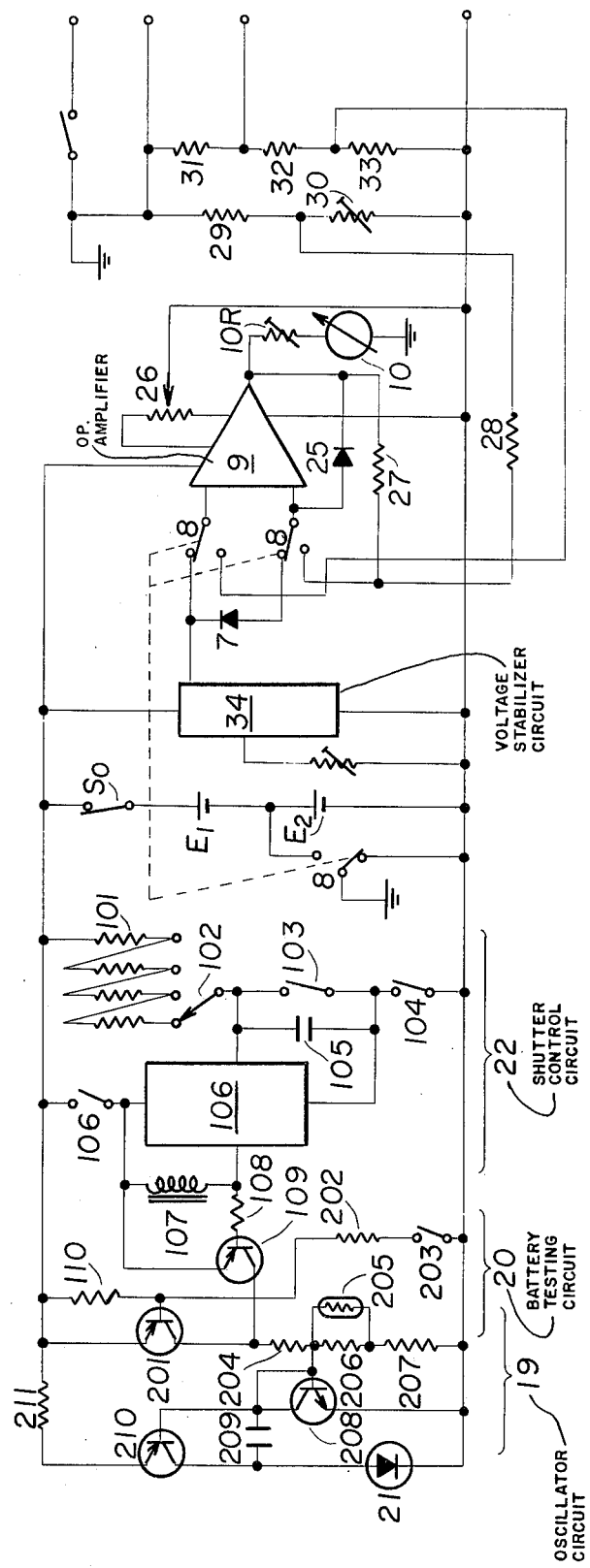
FIG. 2 is a circuit diagram illustrating in more detail the embodiment illustrated in FIG. 1.

Referring now to FIG. 2, a practical example of the embodiment of the exposure control system of FIG. 1 according to the invention is shown, in which the same parts as those of FIG. 1 have like reference numeral characters. The circuit of FIG. 2 comprises an oscillator circuit 19, a battery testing circuit 20, a shutter control circuit 22, voltage supply sources $E_1$ and $E_2$ associated with a main switch $S_0$, an arrangement of a voltage stabilizer circuit 34 to be subsequently described in detail in connection with FIG. 3, and a light value measuring circuit to which arrangement the present invention particularly relates, and a flash energy modifying circuit of resistors 27 through 33. The light value measuring circuit includes a photovoltaic cell 7, an operational amplifier 9 having a pair of input terminals between which the photovoltaic cell is operatively connected through a circuit transfer switch means 8, and having an output terminal connected to a current meter 10 through a variable resistor for setting the current meter 10 to a sensitivity in conformance with the resultant gain of the operational amplifier 9 with a feedback diode 25 having a logarithmic conversion characteristic. The operational amplifier 9 is provided with a variable resistor 26 connected thereto to adjust the offset voltage thereof.

Figure 3:
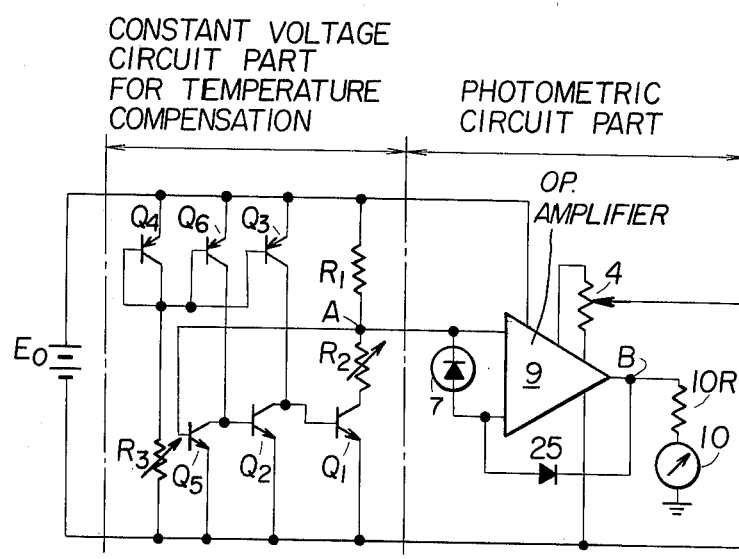
FIG. 3 is a circuit diagram of an example of a combination of sensor and logarithmic converter circuits with a voltage stabilizer circuit adapted for use in the circuit of FIG. 2.

As shown in FIG. 3, the voltage stabilizer circuit 34 comprises six transistors $Q_1$ through $Q_6$ and a voltage divider consisting of a resistor $R_1$ and a variable resistor connected in series with each other and to a transistor $Q_1$ to apply a regulated voltage to the photovoltaic cell connected to the interconnecting point A. In this arrangement, assuming that the voltage level at point A is maintained constant during temperature variation, the output voltage of the light value measuring circuit comprising photovoltaic cell 7, operational amplifier and diode 25 increases with increase in the ambient temperature of the circuit as shown at curve Pb in FIG. 4a, the slope of the curve Pb depending mainly upon the characteristic of the diode 25. As the ambient temperature is varied, the variation of the output voltage results in an erroneous deflection of the needle of the meter 10.

Figure 4A:
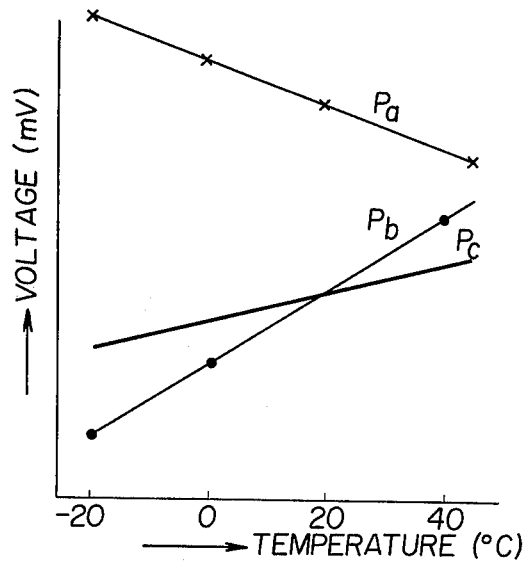
FIG. 4a is a graphic illustration of temperature dependences of the output voltages of the logarithmic converter circuit and the voltage stabilizer circuit of FIG. 3.
Figure 4B:
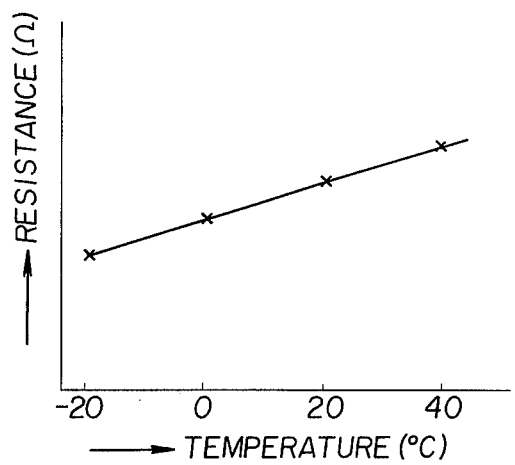
FIG. 4b is a graph illustrating a variation of the resistance with temperature of the moving coil of a current meter of FIG. 2 or FIG. 3.
Figure 5:
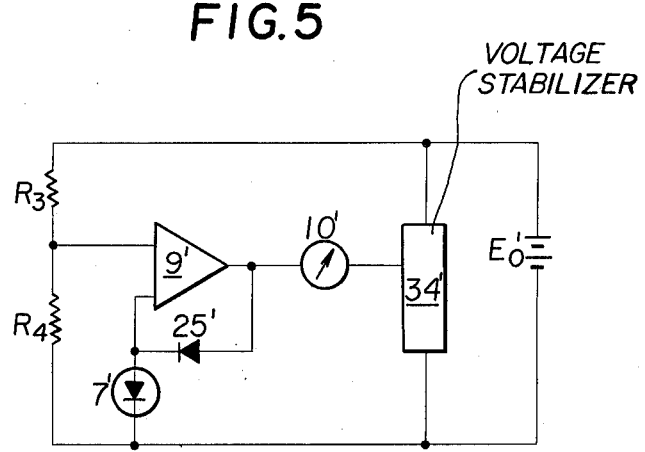
FIG. 5 illustrates a modification in arrangement of the sensor and logarithmic converter circuits and the voltage stabilizer circuit of FIG. 3.

On the other hand, the voltage stabilizer circuit 34 is selected to have an output voltage versus temperature characteristic depicted by curve Pa in FIG. 4a, in which as the ambient temperature increases, the output voltage at point A decreases. As a result, with the arrangement of FIG. 3, it is possible to provide output voltage signals of which the levels are varied with temperature along the curve Pc. The slope of the curve Pc is such that the variation with temperature of the resistance of the moving coil of the current meter cancels the variation with temperature of the output voltage of the logarithmic converter circuit to effect perfect temperature compensation for deflection of the needle of current meter 10.

In operation, the level of luminance of a subject being photographed is sensed by the photovoltaic cell 7 through an objective lens system 1, and its output voltage generated between the two input terminals of the operational amplifier 9 is amplified by the operational amplifier 9 and converted in linear log relationship by the diode 25 to an output current which flows through the moving coil of the current meter 10, thereby the needle of the meter 10 is deflected to a position indicating an effective diaphragm aperture in conformance with the preselected shutter speed and film sensitivity. In order to set the shutter control circuit 22 for the desired shutter interval, the resistor transfer switch 102 is set by turning the shutter speed setting component 12 (FIG. 1) to a position where a time constant circuit with a condenser 105 is formed to establish the intended exposure interval when the camera operator depresses the shutter release button 16. Upon actuation of the button 16, the switch 104 is closed and the switch 103 is opened instantaneously so that the condenser 105 charges. When the voltage across the condenser 105 has reached a predetermined level dependent upon the exposure interval, an electromagnet 107 which when energized holds the rear screen of the focal plane shutter in its opening position is deenergized to release the rear screen to its closing position, thereby the duration of exposure interval is terminated.

It will be seen from the foregoing description that the present invention contemplates the use of a photographic cell and an operational amplifier with a feedback diode having a logarithmic conversion characteristic in an exposure control system for the purpose of deriving reliable and accurate exposure values over a wide range of scene luminance extended particularly toward very low luminances, and the photovoltaic cell and the logarithmic converter are combined with a temperature dependent voltage stabilizer for providing camera diaphragm aperture control signals of which the levels are stabilized against variation of the ambient temperature of the exposure control system. In photography applications requiring rigorous accuracy of exposure control over an extended range of scene luminance despite variation of the ambient temperature, therefore, the exposure control apparatus constructed in accordance with the invention can meet the requirements.

The invention has been described above in connection with a purely schematic example which can be changed in many ways. For example, instead of the connection of the voltage stabilizer to the photovoltaic cell in a bias condition, it is possible to arrange the voltage stabilizer for connection to one terminal of the current meter of which the other terminal is connected to the output terminal of the amplifier as applying a temperature dependence stabilized voltage to the current meter. Instead of the automatic regulation of the diaphragm aperture, it is possible to manually set the diaphragm device of the camera upon reading the effective diaphragm aperture value indicated by the deflected needle of the current meter through the viewfinder.

Moreover, photovoltaic cells have very high impedances for low scene luminance range. In order to insure a sufficiently fast response time for the photovoltaic cell throughout the entire range of scene luminance, therefore, it is necessary to bring the light value measuring circuit into operation slightly before an actuation of the shutter control mechanism is initiated. The provision for insuring fast response time for the photovoltaic cell even in a low scene luminance range is made in circuits illustrated in FIGS. 6 and 7, in which the same parts as those of FIGS. 1 - 5 have like reference numeral characters. The circuit of FIG. 6 consists of a diaphragm aperture control circuit of the characteristic described and a shutter control circuit operatively associated therewith. The diaphragm aperture control circuit comprises a voltage stabilizer 34' connected across a battery $E'_0$ through a main switch $S'_0$ operable independently of a shutter actuator switch $S'_{01}$ to render the light value measuring circuit operative for the aforesaid purpose, an operational amplifier 9 having a pair of input terminals, one of which is connected to the stabilizer 34' and having an output terminal, a logarithmic converter element 25' connected between the other input terminal and the output terminal of the amplifier 9', a photovoltaic cell 7' connected to the input terminal of the element 25', and diaphragm value indicating means comprising a current meter 10'. The shutter control circuit which is of non-store type comprises a logarithmic extension transistor 101' of which the base electrode is connected to a switch $S'_{02}$ and of which the collector electrode is connected through a resistor to an integrator condenser 105', a start switch 103' connected across the condenser 105', and a Schmitt type circuit of which the input terminal is connected to the interconnecting point, $b$, between the resistor and the condenser 105', and of which output terminal is connected to an electromagnet 107'.

Prior to initiation of exposure, the main switch $S'_0$ is closed to render the light value measuring circuit operative. In the next time, when the camera operator depresses the shutter release button 16, the switches $S'_{01}$ and $S'_{02}$ are closed to actuate the front screen of the camera shutter to the opening position, thereby an exposure being initiated, and at the same time the start switch 103' is opened so that the integrator condenser 105' begins to change. When the voltage at point $b$, has reached down a certain level, the Schmitt type circuit 106' is triggered to deenergize the electromagnet 107', thereby the rear screen of the camera shutter is released from the opening position to the closing position.

Figure 6:
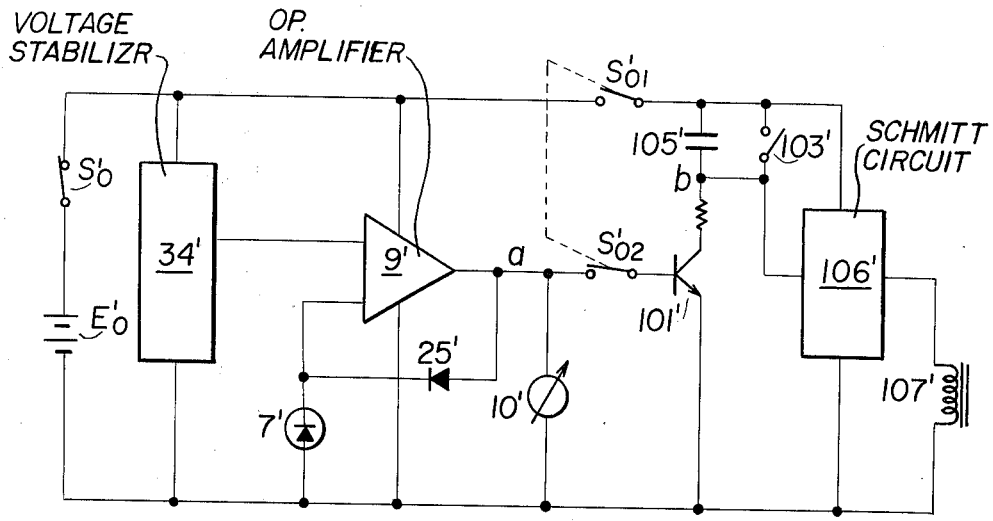
FIG. 6 is a circuit diagram of non-memory type of light value measuring circuit including the sensor and logarithmic converter circuits associated with the voltage stabilizer circuit of FIG. 2 with a slight modification.
Figure 7:
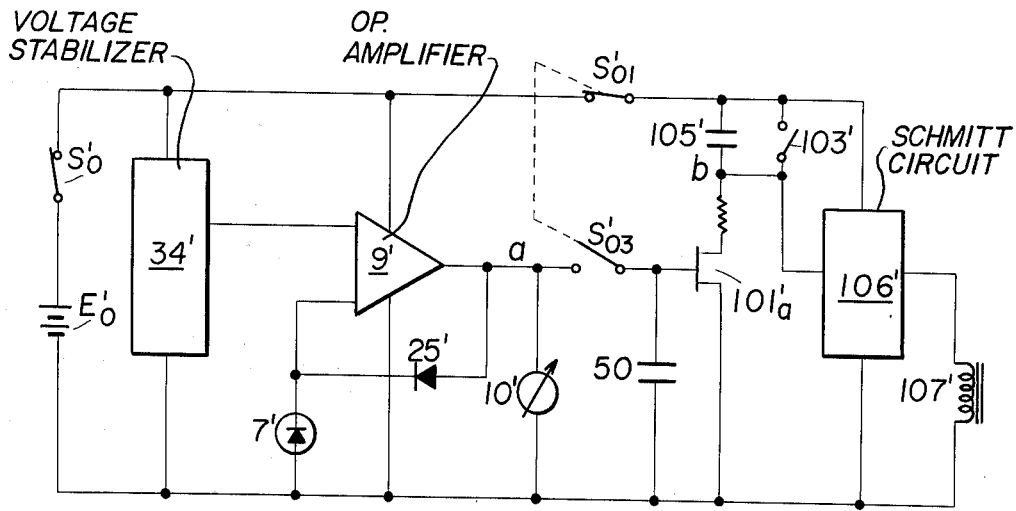
FIG. 7 is a circuit diagram of a memory type of light value measuring circuit including the sensor and logarithmic converter circuit associated with the voltage stabilizer circuit of FIG. 2 with a slight modification.

In FIG. 7, a diaphragm aperture control circuit of the same function as in FIG. 6 is operatively associated with a store type shutter control circuit constructed by adding a store condenser 50 to the shutter control circuit of FIG. 6 and using a logarithmic extension field effect transistor 101a' instead of the transistor 101'. With the arrangement shown in FIG. 6 or FIG. 7, it is possible not only to insure a fast response time for the photovoltaic cell sensing a low scene luminance, but also to largely reduce the amount of current energy which might be otherwise used up by the exposure control apparatus.

What is claimed is:

1. An exposure control apparatus comprising:
    a photovoltaic cell positioned to sense the level of luminance of an object to be photographed;
    a logarithmic converter circuit connected to said photovoltaic cell, comprising operational amplifier means for amplifying the output of said cell and logarithmic converter means for logarithmically compressing the amplified output of said photovoltaic cell, said logarithmic converter means having a negative temperature coefficient, said logarithmic converter circuit having an output level which takes on a value which varies as a constant ratio of the value corresponding to the output of the photovoltaic cell depending on temperature, and wherein the amount of variation of the converter output level dependent upon temperature takes on different values depending on the output of the photovoltaic cell at a prescribed temperature;
    a source of electrical power;
    voltage stabilizer means connected between said power source and said amplifier means for supplying a standard voltage to said amplifier means, comprising temperature correction means for changing the standard voltage corresponding to ambient temperature, said change taking on a constant value at a certain temperature whereby the standard voltage is changed proportionally with the ambient temperature and the output of said logarithmic converter circuit varies in accordance with the change of the standard voltage;
    electric resistance means coupled to the output terminal of said logarithmic converter circuit, said resistance means having a positive temperature coefficient, for correcting the output of said logarithmic converter; and indicating means coupled to said electric resistance means to indicate the value corresponding to the output of said photovoltaic cell;

whereby the amount of variation of the logarithmic converter circuit dependent on temperature is substantially totally compensated by the simultaneous action of the variation of the standard voltage and the variation of the resistance value of the resistance means.

2. An exposure control apparatus as described in claim 1, wherein said logarithmic converter means is a diode connected between the input and the output terminal of said amplifier means.

3. An exposure control apparatus as described in claim 1, wherein said voltage stabilizer means includes an odd number of transistors connected in cascade and also includes a feedback circuit between the output of the last transistor and the base of the first transistor.

4. An exposure control apparatus as described in claim 3, wherein one of the transistors functions as said temperature correction means.

5. An exposure control apparatus comprising:

photoelectric transformation means to transform the light from an object into electric energy according to the level of luminance;

a logarithmic converter circuit coupled to said photoelectric transformation means, comprising amplifier means for amplifying the output of said photoelectric transformation means and logarithmic converter means coupled to said amplifier means to logarithmically compres the output of said photoelectric transformation means, wherein the output of said logarithmic converter circuit takes on values corresponding to the output of the photoelectric transformation means and also simultaneously takes on such values in accordance with temperature from values corresponding to the output of the photoelectric transformation means, whereby the amount of variation of the output of the logarithmic converter with temperature assumes different values depending on the variation of the output of the photoelectric transformation means at a prescribed temperature;

voltage stabilizer means for supplying a standard bias voltage to said amplifier means and for changing the value of said voltage corresponding to ambient temperature; and indicating means coupled to said logarithmic converter circuit, comprising a moving coil, having associated electrical resistance with a positive temperature coefficient;

whereby the ambient temperature variation of the output of the logarithmic converter means is cancelled by the simultaneous and co-working action of the variations of the resistance and standard bias voltage with temperature, and wherein current will flow to said moving coil of said indicating means which is not dependent on ambient temperature.

6. An exposure control apparatus comprising:

photoelectric means for providing an electrical output signal proportional to the level of luminance of a scene object;

a logarithmic converter circuit coupled to said photoelectric means including means for amplifying the output signal of said photoelectric means and means for logarithmically compressing the amplified output of said photoelectric means, said logarithmic converter circuit having an uncompensated output signal which changes with ambient temperature wherein the amount of variation of the output signal takes on different values depending on the output value of the photoelectric means at a prescribed temperature;

means for supplying a standard voltage to said logarithmic converter circuit, said standard voltage changing corresponding to ambient temperature, wherein the amount of variation of the standard voltage with temperature assumes a constant value at a prescribed temperature, and the logarithmic converter circuit will have an almost compensated output voltage when the standard voltage is coupled thereto;

resistance means coupled to the output of said logarithmic circuit means and having a positive temperature coefficient so that the almost compensated output voltage of the converter circuit is completely compensated by the variation with temperature of the resistance value of the resistance means; and output means driven by the output of the converter circuit, said output means being temperature compensated by the simultaneous and co-working action of the amount of temperature variation of the standard voltage and the variation in the resistance value of the resistance means, said output means for effecting exposure control.

* * * * *